US012706688B2

(12) United States Patent
Mutter et al.

(10) Patent No.: US 12,706,688 B2
(45) Date of Patent: Aug. 11, 2026

(54) SUBSCRIBER STATION FOR A SERIAL BUS SYSTEM, AND METHOD FOR COMMUNICATION ON A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE); Franz Bailer, Moessingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 605 days.

(21) Appl. No.: 18/252,806

(22) PCT Filed: Oct. 7, 2021

(86) PCT No.: PCT/EP2021/077636

§ 371 (c)(1),
(2) Date: Jun. 2, 2023

(87) PCT Pub. No.: WO2022/106113

PCT Pub. Date: May 27, 2022

(65) Prior Publication Data

US 2025/0080269 A1 Mar. 6, 2025

(30) Foreign Application Priority Data

Nov. 18, 2020 (DE) ..................... 10 2020 214 535.0

(51) Int. Cl.
*H04L 1/00* (2006.01)
*H04L 12/40* (2006.01)

(52) U.S. Cl.
CPC .......... *H04L 1/0025* (2013.01); *H04L 1/0028* (2013.01); *H04L 12/40013* (2013.01)

(58) Field of Classification Search
None
See application file for complete search history.

(56) References Cited

U.S. PATENT DOCUMENTS

2014/0328357 A1* 11/2014 Fredriksson .......... H04J 3/0658 370/520
2018/0262327 A1* 9/2018 Jain .................. H04L 12/40013
2020/0226274 A1* 7/2020 Juliato .................. G06F 21/62

FOREIGN PATENT DOCUMENTS

CN 104620542 B * 10/2018 ............ H04L 69/18
CN 110838960 A 2/2020
(Continued)

OTHER PUBLICATIONS

International Search Report for PCT/EP2021/077636, Issued Jan. 12, 2022.
ISO 11898-1:2015 STANDARD, 2015, pp. 1-74.

*Primary Examiner* — Gerald A Smarth
(74) *Attorney, Agent, or Firm* — NORTON ROSE FULBRIGHT US LLP

(57) ABSTRACT

A subscriber station for a serial bus system and a method for communication in a serial bus system. The subscriber station has a communication control device for controlling a communication of the subscriber station with at least one other subscriber station of the bus system and for evaluating a signal received from a bus of the bus system, in which the bit time in a first communication phase may differ from a bit time in a second communication phase, and the communication control device is developed to sample and evaluate the signal received from the bus, which is based on a transmit signal generated by another subscriber station, according to a predefined frame.

16 Claims, 7 Drawing Sheets

(56) References Cited

FOREIGN PATENT DOCUMENTS

| | | | | | |
|---|---|---|---|---|---|
| CN | 111713074 | A | | 9/2020 | |
| CN | 111713075 | A | | 9/2020 | |
| CN | 118828675 | A | * | 10/2024 | .......... H04W 72/542 |
| DE | 102018218721 | A1 | * | 4/2020 | ........... H04L 12/413 |
| EP | 2712123 | A1 | | 3/2014 | |
| EP | 3531629 | A1 | | 8/2019 | |
| JP | 2014518485 | A | | 7/2014 | |
| JP | 2015536067 | A | | 12/2015 | |

* cited by examiner 1
10
subscriber station
communication control device
11
phase-error compensation module
15
transceiver
12
45,46
41
42
40
20
21
25
22
46
30
31
35
32
47

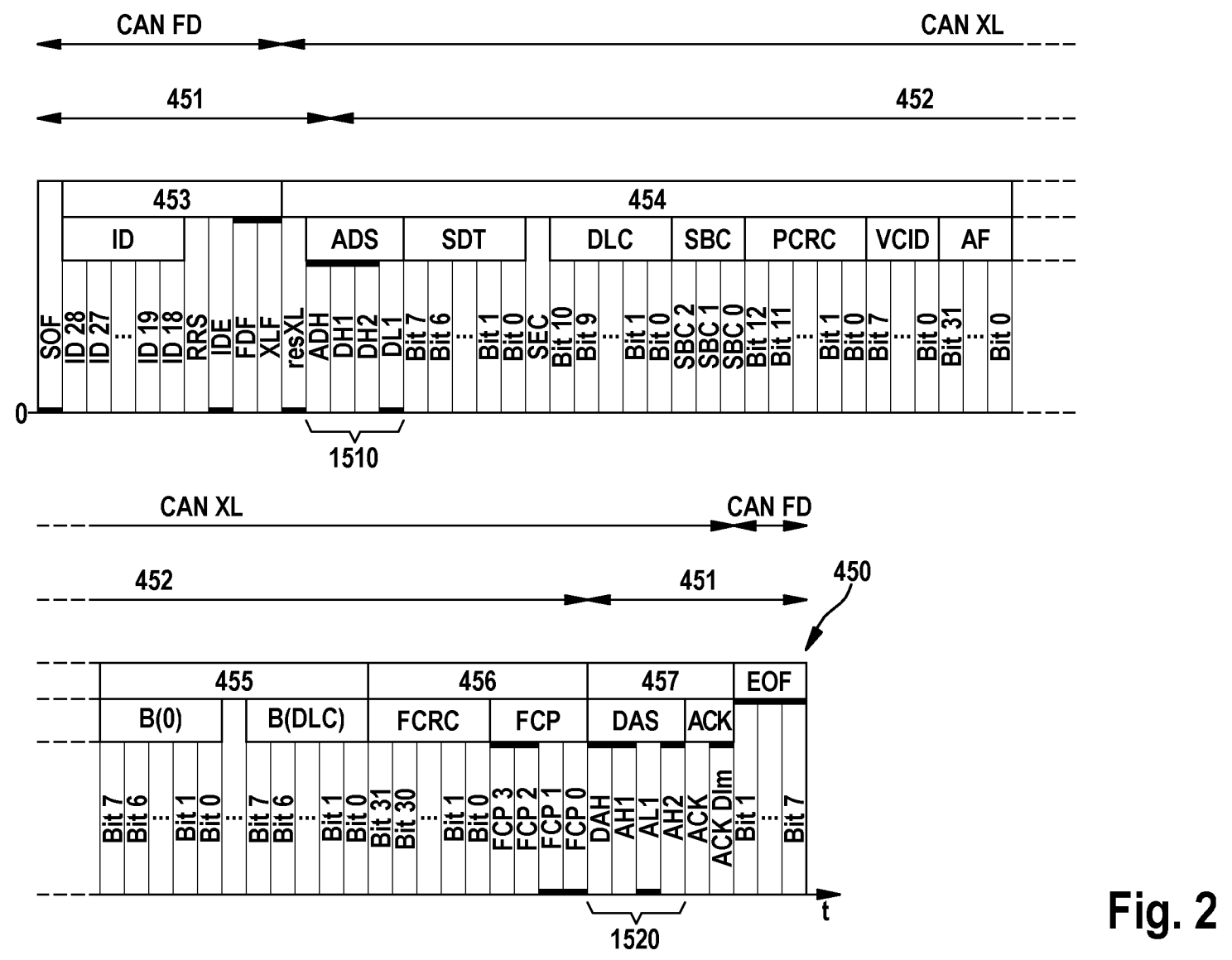

CAN FD
CAN XL
451
452
453
454
SOF
ID
ID 28
ID 27
...
ID 19
ID 18
RRS
IDE
FDF
XLF
resXL
ADS
ADH
DH1
DH2
DL1
1510
SDT
Bit 7
Bit 6
...
Bit 1
Bit 0
SEC
DLC
Bit 10
Bit 9
...
Bit 1
Bit 0
SBC
SBC 2
SBC 1
SBC 0
PCRC
Bit 12
Bit 11
...
Bit 1
Bit 0
VCID
Bit 7
...
Bit 0
AF
Bit 31
...
Bit 0
0

CAN XL
CAN FD
452
451
450
455
456
457
B(0)
Bit 7
Bit 6
...
Bit 1
Bit 0
...
B(DLC)
Bit 7
Bit 6
...
Bit 1
Bit 0
FCRC
Bit 31
Bit 30
...
Bit 1
Bit 0
FCP
FCP 3
FCP 2
FCP 1
FCP 0
DAS
DAH
AH1
AL1
AH2
1520
ACK
ACK
ACK Dlm
EOF
Bit 1
...
Bit 7
t

Fig. 2

1520
t_bt2
t_bt1
TxD
1
0
FCP 3
FCP 2
FCP 1
FCP 0
DAH
AH1
AL1
t

TXD
1
0
DAH
AH1
AL1
t
T_V1
SB_D1
SB_D0

TxD_TC
T_V2
1
0
FCP 3
FCP 2
FCP 1
FCP 0
DAH
AH1
AL1
t

RxD
1
0
FCP 3
FCP 2
FCP 1
FCP 0
DAH
AH1
AL1
t
t_SY

RxD_E
T_P
1
0
FCP 3
FCP 2
FCP 1
FCP 0
DAH
AH1
AL1
t
t_1
t_2

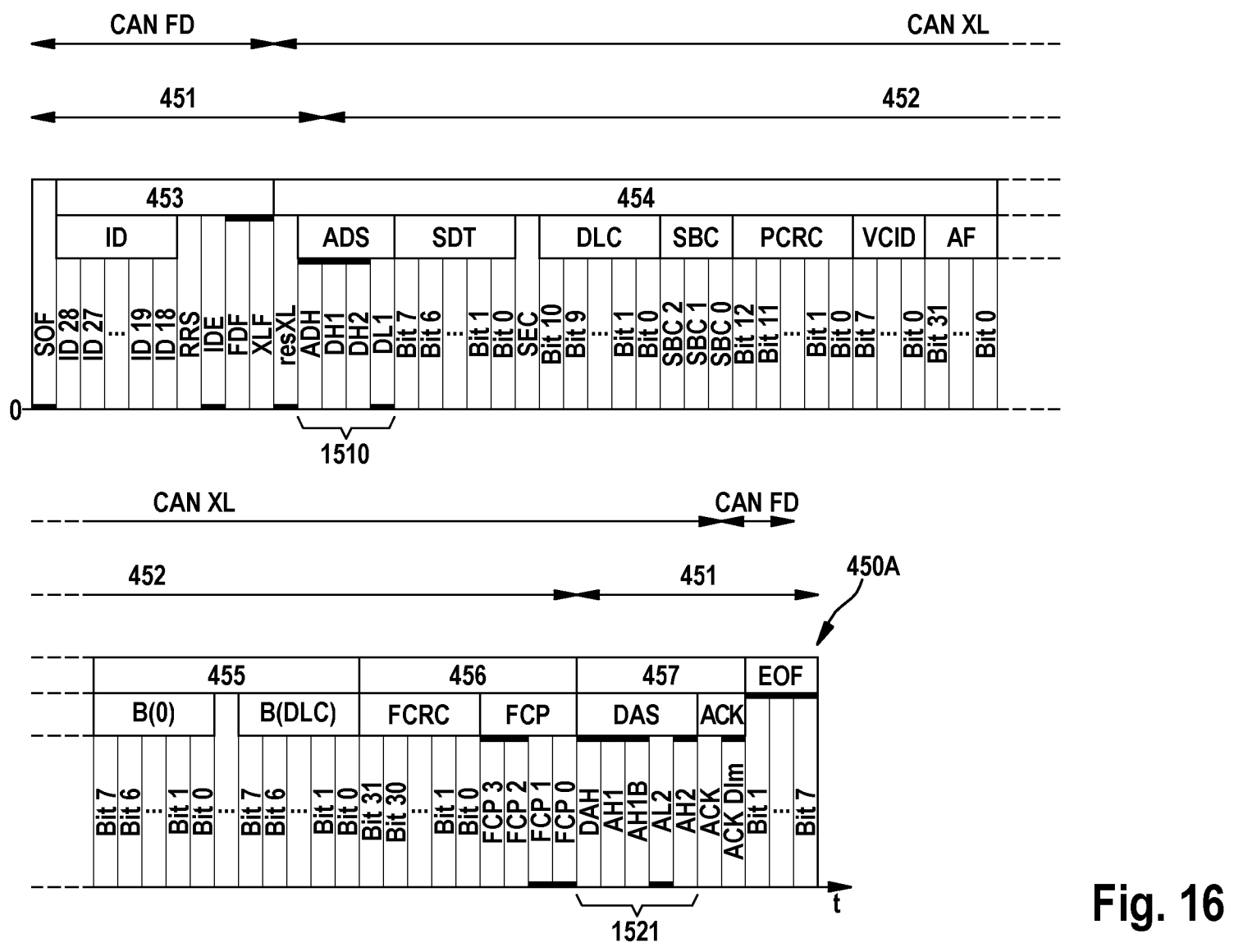

CAN FD
CAN XL
451
452
453
454
SOF
ID
ID 28
ID 27
...
ID 19
ID 18
RRS
IDE
FDF
XLF
resXL
ADS
ADH
DH1
DH2
DL1
1510
SDT
Bit 7
Bit 6
...
Bit 1
Bit 0
SEC
DLC
Bit 10
Bit 9
...
Bit 1
Bit 0
SBC
SBC 2
SBC 1
SBC 0
PCRC
Bit 12
Bit 11
...
Bit 1
Bit 0
VCID
Bit 7
...
Bit 0
AF
Bit 31
...
Bit 0
0

450A
CAN XL
CAN FD
452
451
455
456
457
B(0)
Bit 7
Bit 6
...
Bit 1
Bit 0
...
B(DLC)
Bit 7
Bit 6
...
Bit 1
Bit 0
FCRC
Bit 31
Bit 30
...
Bit 1
Bit 0
FCP
FCP 3
FCP 2
FCP 1
FCP 0
DAS
DAH
AH1
AH1B
AL2
AH2
1521
ACK
ACK
ACK Dlm
EOF
Bit 1
...
Bit 7
t

Fig. 16

SUBSCRIBER STATION FOR A SERIAL BUS SYSTEM, AND METHOD FOR COMMUNICATION ON A SERIAL BUS SYSTEM

FIELD

The present invention relates to a subscriber station for a serial bus system and to a method for communication in a serial bus system which is operated at a high data rate as well as with great flexibility and a high error robustness.

BACKGROUND INFORMATION

Depending on the number of functions of a technical system or a vehicle, bus systems for the communication between sensors and control devices such as in vehicles are intended to enable the transfer of a large data quantity. It is often required that the data can be transmitted from the transmitter to the receiver more rapidly than at present and, if required, even large data packets are transmittable.

In vehicles, a bus system in which data are transmitted as messages in the ISO 11898-1:2015 standard as the CAN protocol specification using CAN FD is currently in the introductory phase. The messages are transmitted between the bus subscribers of the bus system, e.g., a sensor, control device, actuator, etc. To this end, the message is transmitted onto the bus in a frame in which a switch between two communication phases takes place. In the first communication phase (arbitration), it is negotiated which one of the subscriber stations of the bus system may transmit its frame onto the bus in the following second communication phase (data phase or transmission of the user data). Most manufacturers use CAN FD in the first step at an arbitration bit rate of 500 kbit/s and a data bit rate of 2 Mbit/s in the vehicle. In the transmission on the bus, a switch is thus to be made between a slow operating mode and a fast operating mode.

To achieve even higher data rates in the second communication phase, a successor bus system for CAN FD is being developed at present, which is known as CAN XL and is currently standardized at the Organization CAN in Automation (CiA). Apart from the pure data transport across the CAN bus, CAN XL is meant to support also other functions such as functional safety, data security, and quality of service (QoS). These are elementary properties which are required in an autonomously driving vehicle.

CAN XL is to support high bit rates in the data phase such as up to 15 Mbit/s or even 20 Mbit/s. To achieve this goal, transceivers are used whose operating mode is able to be switched over to achieve the required high bit rates in the data phase. In contrast, the bit rate in the arbitration phase stays at approximately 500 kbit/s to allow for the arbitration. To be able to use especially high bit rates in the data phase, the transceiver, which is currently standardized for CAN XL, is able to switch its operating mode. A MICI module (MICI=Media Independent CAN Interface) is used between a communication control device, especially its protocol controller, and a transceiver so that no further connection (pin) is required to signal the operating mode switchover.

In CAN XL, the communication control device, in particular its protocol controller, signals to the transceiver that the transceiver must switch its operating mode from slow to fast or from fast to slow. For the signaling, the communications control device, in particular its protocol controller, or the downstream MICI module uses encoding with the aid of a pulse-width modulation, which is also known as PWM encoding. The transceiver performs a PWM decoding operation in order to be able to drive the individual bits as a differential voltage on the CAN bus.

The fact that the PWM encoding in the communication control device and the respective PWM decoding in the transceiver require time poses a problem. For this reason, the runtime from the transmitting communication control device to a receiving communication control device during the data phase and an ADH bit at the end of the data phase is longer than during the arbitration phase. During a DAS field, which is provided during the transition from the data phase to the arbitration phase in a CAN XL frame, a subscriber station that is currently only the receiver of a message transmitted via the bus (receive node) must synchronize to the shortened runtime between the transmitting subscriber station (transmit node) and the receive node. However, the bit in the DAS field provided for this purpose may end too early because of the shortened runtime. As a result, the receive node may be unable to reliably sample this bit in all situations and consequently also not synchronize properly.

As a result, the phase error in the receive node, which came about by the shortened runtime during the switchover from the data phase to the arbitration phase, remains. The CAN XL protocol is therefore not operative, which means that no reliable and robust communication is possible.

In addition, it may be that the receive node detects a formatting error of the currently transmitted frame if it has sampled an AH1 bit in the DAS field as a 0. This leads to a rejection of the frame as invalid in the receive node. This is a systematic error and means that certain bit rate settings are not possible with CAN XL and other bit rate settings do not function robustly.

SUMMARY

It is an object of the present invention to provide a subscriber station for a serial bus system and a method for communication in a serial bus system that solve the above-mentioned problems. In particular, a subscriber station for a serial bus system and a method for communication in a serial bus system are to be provided in which an excellent error robustness of the communication is realizable even at a high data rate, without exceptions for certain bit rates, as well as an increase in the amount of user data per frame.

The object may achieved by a subscriber station for a serial bus system having the features of present invention. According to an example embodiment of the present invention, the subscriber station has a communication control device for controlling a communication of the subscriber station with at least one other subscriber station of the bus system, and for evaluating a signal received from a bus of the bus system in which the bit time in a first communication phase may differ from a bit time in a second communication phase, and the communication control device is developed to sample and evaluate the signal received from the bus, which is based on a transmit signal generated by another subscriber station, according to a predefined frame, and in the predetermined frame, a predefined field which indicates a transition from the second communication phase to the first communication phase has two or three bits with the logical value 1 between the beginning and the following falling edge of the predetermined field, and the communication control device is developed to evaluate a frame which the communication control device has sampled from the signal received from the bus as a predetermined frame and thus as valid with regard to the predetermined field, independently of whether only one bit or two consecutive bits with the logical value 1 was/were sampled between the beginning of the field and the following falling edge, and the communication control device is developed to perform a synchronization at the falling edge of the predetermined field.

According to an example embodiment of the present invention, a sampling rule for the DAS field is implemented in the subscriber station at the end of the data phase, on the basis of which CAN XL receive nodes is able to robustly synchronize in the DAS field. The synchronization is therefore no longer dependent on the bit-timing configuration or the configuration of a pulse-width modulation (PWM) of the transmit signal. In the process, the bit rate switchover following the second communication phase (data phase) in the transition from the second communication phase (data phase) to the first communication phase (arbitration phase) functions very reliably as well.

With the aid of the subscriber station, a reliable and robust communication using CAN XL is thus enabled in the first place. This applies also at an extreme setting of the system parameters such as a clock tolerance, PWM symbol length, bit-timing setting, or other parameters of the bus system.

It is furthermore advantageous that the described development of the subscriber station for attaining the abovementioned object is able to be realized without special effort and thus in a cost-effective manner.

According to an example embodiment of the present invention, the subscriber station in the bus system thus makes it possible to retain an arbitration from CAN in a first communication phase while still achieving a further considerable increase in the transmission rate in comparison with CAN or CAN FD.

The method carried out by the subscriber station may also be used if at least one CAN subscriber station and/or at least one CAN FD subscriber station, which transmit(s) messages according to the CAN protocol and/or the CAN FD protocol, is/are also available in the bus system, Advantageous further embodiments of the subscriber station of the present invention are disclosed herein.

According to one embodiment of the present invention, the predetermined field has four bits with the bit time of the first communication phase, the predetermined field having a bit sequence with the logical value 1101, and the communication control device is developed, after sampling a bit having the logical value 1 in the signal received from the bus between the beginning of the field and the following falling edge, to evaluate the next bit which is sampled with the logical value 0 in the signal received from the bus and sampled at the latest for the third bit of expected bit sequence 1101, as the third bit of the expected bit sequence 1101.

According to an exemplary embodiment of the present invention, the communication control device may be developed to evaluate a frame as faulty which the communication control device has sampled from the signal received from the bus if the first bit of the predetermined field has not been sampled as logic 1. In addition, the communication control device may be developed to activate a hard synchronization when the first bit of the predetermined field is sampled as logic 1.

In addition, according to an exemplary embodiment of the present invention, the communication control device may be developed to evaluate a frame, which the communication control device has sampled from the signal received from the bus, as faulty if neither the first bit nor the second bit of the predetermined field was sampled as logic 1. Here, the communication control device may be developed to evaluate a frame, which the communication control device has sampled from the signal received from the bus, as not faulty but as valid with regard to the predetermined field if the first bit of the predetermined field was sampled as logic 0 and the second bit of the predetermined field was sampled as logical 1, or if the first bit of the predetermined field was sampled as logic 1 and the second bit of the predetermined field was sampled as logic 0. Here, the communication control device may be developed to activate a hard synchronization or a synchronization if the first bit of the predetermined field is sampled as logical 1 or if the second field of the predetermined bit is sampled as logic 1.

According to another embodiment of the present invention, the predetermined field has five bits with the bit time of the first communication phase. In this context, the predetermined field possibly has a bit sequence with the logical value 11101, and the communication control device (11; 31) is developed, after sampling a bit with the logical value 1 for the second bit of the bit sequence in the signal received from the bus, to evaluate the next bit that is sampled with the logical value 0 in the signal received from the bus and is sampled at the latest for the fourth bit of the expected bit sequence, as the fourth bit of the expected bit sequence.

In addition, according to an example embodiment of the present invention, the communication control device may be developed to ignore the sampled value of the first bit of the predetermined field in a frame which the communication control device has sampled from the signal received from the bus, and to evaluate a random value as not faulty for the third bit of the predetermined field, and the communication control device is developed to evaluate a frame which the communication control device has sampled from the signal received from the bus as faulty if the second bit of the predetermined field was sampled as logic 0. In addition, the communication control device may be developed to activate a hard synchronization if the second bit of the predetermined field is sampled as logic 1.

It is possible that the subscriber station also has a transceiver for transmitting a transmit signal onto the bus of the bus system and/or for receiving a signal from the bus of the bus system. In this instance, the communication control device may be developed to generate the transmit signal, the communication control device furthermore being developed to signal to the transceiver with the aid of a pulse-width modulation in the transmit signal that the transceiver must switch its operating mode to an operating mode for transmitting in the first communication phase or to an operating mode for transmitting in a second communication phase.

In addition, according to an example embodiment of the present invention, the subscriber station may have a signal-improvement module for accelerating a transition on the bus in the first communication phase from a dominant bus level to a recessive bus level which can be overwritten by the dominant bus level, and the transceiver may be developed to additionally activate the signal-improvement module to accelerate the transition from one of the bus levels of the second communication phase to the recessive level of the first communication phase if the subscriber station is a transmitter of the transmit signal onto the bus and the transceiver switches from an operating mode in which the communication control device transmits the transmit signal onto the bus of the bus system in the second communication phase to an operating mode in which the communication control device transmits the transmit signal onto the bus of the bus system in the first communication phase.

It is possible that the predetermined frame is developed to be compatible with CAN FD, and negotiations take place in the first communication phase as to which one of the subscriber stations of the bus system is given an at least intermittent exclusive, collision-free access to the bus in the following second communication phase.

The above-described subscriber station may be part of a bus system that also includes a bus and at least two subscriber stations which are connected to one another via the bus in such a way that they have the ability to serially communicate with one another. At least one of the at least two subscriber stations is an above-described subscriber station.

The above-mentioned object may furthermore be achieved by a method for communication in a serial bus system according to the present invention. According to an example embodiment of the present invention, the method is carried out using a subscriber station of the bus system which has a communication control device, the method including the steps of controlling, with the aid of the communication control device, a communication of the subscriber station with at least one other subscriber station of the bus system, and evaluating a signal received from a bus of the bus system in which the bit time in a first communication phase may differ from a bit time in the second communication phase, the communication control device sampling and evaluating the signal received from the bus, which is based on a transmit signal generated by another subscriber station, according to a predetermined frame, and in the predetermined frame, a predetermined field, which indicates a transition from the second communication phase to the first communication phase, has two or three bits with the logical value 1 between the beginning and the following falling edge of the predetermined field, and the communication control device evaluates a frame which the communication control device has sampled from the signal received from the bus as a predetermined frame and thus as valid with regard to the predetermined field, independently of whether only one bit or two consecutive bits with the logical value 1 was/were sampled in the signal received from the bus between the beginning of the field and the following falling edge, and the communication control device carries out a synchronization at the falling edge of the predetermined field.

The method offers the same advantages as those mentioned above with regard to the subscriber station.

Further possible implementations of the present invention also include not explicitly mentioned combinations of features or embodiments described earlier or in the following text with regard to the exemplary embodiments. One skilled in the art will also add individual aspects as improvements or supplementations to the respective basic form of the present invention.

BRIEF DESCRIPTION OF THE DRAWINGS

In the following text, the present invention will be described in greater detail with reference to the figures and on the basis of exemplary embodiments.

FIG. 2 shows a diagram to illustrate the structure of a message which a subscriber station of the bus system is able to transmit according to the first exemplary embodiment of the present invention.

FIG. 16 shows a diagram to illustrate the structure of a message that a subscriber station of the bus system is able to transmit according to the third exemplary embodiment of the present invention.

Unless stated to the contrary, the same or functionally equivalent elements in the figures have been provided with the same reference numerals.

DETAILED DESCRIPTION OF EXAMPLE EMBODIMENTS

Figure 1:
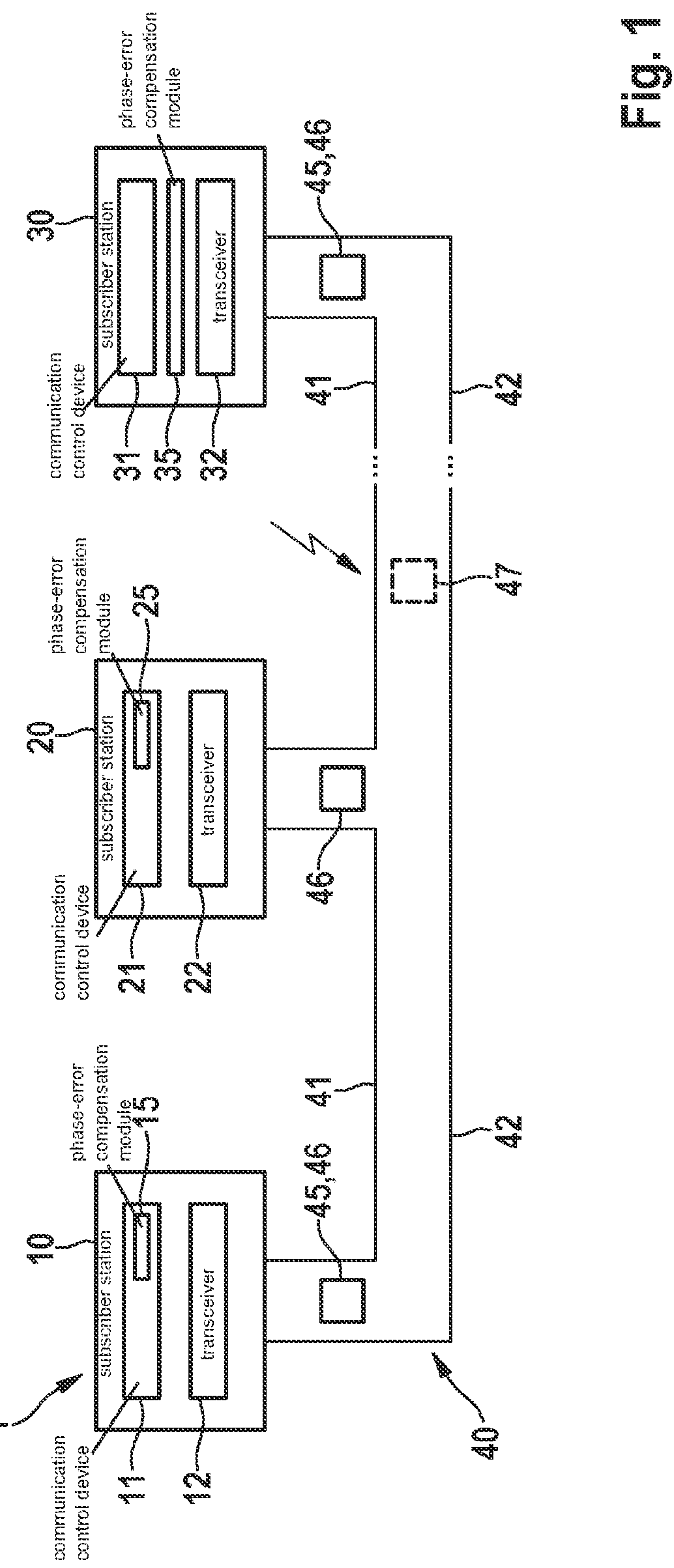
FIG. 1 shows a simplified block circuit diagram of a bus system according to a first exemplary embodiment of the present invention.

By way of example, FIG. 1 shows a bus system 1, which is basically equipped for a CAN bus system, a CAN FD bus system, a CAN XL bus system, and/or variations thereof, as described in the following text. Bus system 1 may be used in a vehicle, in particular a motor vehicle, an airplane, etc., or in a hospital, etc.

In FIG. 1, bus system 1 has a multitude of subscriber stations 10, 20, 30, each being connected to a bus 40 by a first bus core 41 and a second bus core 42. Bus cores 41, 42 may also be referred to as CAN_H and CAN_L or CAN-XL_H and CAN-XL_L and are used for an electric signal transmission after an incoupling of the dominant levels or a generation of recessive levels or other levels for a signal in the transmit state. Messages 45, 46 in the form of signals are serially transmittable across bus 40 between individual subscriber stations 10, 20, 30. If an error occurs in the communication on bus 40, as shown by the jagged black block arrow in FIG. 1, an error frame 47 (error flag) may optionally be transmitted. Subscriber stations 10, 20, 30 are control devices, sensors, display devices, etc. of a motor vehicle, for example.

As illustrated in FIG. 1, subscriber station 10 has a communication control device 11, a transceiver 12, and a phase-error compensation module 15. Subscriber station 20 has a communication control device 21, a transceiver 22, and optionally a phase-error compensation module 25. Subscriber station 30 has a communication control device 31, a transceiver 32, and a phase-error compensation module 35. Transceivers 12, 22, 32 of subscriber stations 10, 20, 30 are directly connected to bus 40, even if this is not illustrated in FIG. 1.

Communication control devices 11, 21, 31 are used for the control of a communication of respective subscriber station 10, 20, 30 via bus 40 with at least one other subscriber station of subscriber stations 10, 20, 30 that are connected to bus 40.

Communication control devices 11, 31 prepare and read first messages 45, which are modified CAN messages 45, for instance. Modified CAN messages 45 are constructed on the basis of a CAN XL format, which is described in greater detail with reference to FIG. 2 and uses respective phase-error compensation module 15, 35. Depending on the requirements, communication control devices 11, 31 may furthermore be developed to supply a CAN XL message 45 or a CAN FD message 46 for transceiver 32 or to receive such a message from there. Here, too, use is made of respective phase-error compensation modules 15, 35. Communication control devices 11, 31 thus prepare and read a first message 45 or a second message 46, first and second messages 45, 46 differing in their data-transmission standard, i.e., CAN XL or CAN FD in this case.

Communication control device 21 may be developed like a conventional CAN controller according to ISO 11898-1:2015, i.e., like a CAN FD-tolerant classic CAN controller or a CAN FD controller. Phase-error compensation module 25, which has the same function as phase-error compensation modules 15, 35, is optionally provided in addition. Communication control device 21 prepares and reads second messages 46 such as CAN FD messages 46. CAN FD messages 46 may include between 0 to 64 data bytes, which are furthermore transmitted at a considerably faster data rate than in a classic CAN message transmission. Communication control device 21 is particularly developed in the way of a conventional CAN FD controller.

Transceiver 22 may be developed like a conventional CAN transceiver according to ISO 11898-1:2015 or a CAN FD transceiver. Depending on the requirement, transceivers 12, 32 may be developed to supply messages 45 according to the CAN XL format or messages 46 according to the current CAN FD format for associated communication control device 11, 31 or to receive such messages from it.

With the aid of the two subscriber stations 10, 30, a generation and subsequent transmission of messages 45 using the CAN XL format and also the receiving of such messages 45 are able to be realized.

FIG. 2 shows a CAN XL frame 450 for message 45 as it is supplied by communication control device 11 for transceiver 12 for a transmittal onto bus 40. In the current exemplary embodiment, communication control device 11 sets up frame 450 to be compatible with CAN FD, as also illustrated in FIG. 2. The same analogously applies to communication control device 31 and transceiver 32 of subscriber station 30.

According to FIG. 2, CAN XL frame 450 for the CAN communication on bus 40 is subdivided into different communication phases 451, 452, that is, an arbitration phase 451 and a data phase 452. After a start bit (SOF), frame 450 includes an arbitration field 453, a control field 454 with an ADS field 1510 for a switchover between communication phases 451, 452, a data field 455, a checksum field 456, and also a frame end field 457 in which a DAS field 1520 is provided for a switchover between communication phases 452, 451. This is followed by an end of frame field (EOF).

In arbitration phase 451, using an identifier (ID) having bits ID28 to ID18 in arbitration field 453, for instance, a bit-by-bit negotiation takes place between subscriber stations 10, 20, 30 as to which subscriber station 10, 20, 30 wants to transmit message 45, 46 with the highest priority and thus receives an exclusive access to bus 40 of bus system 1 for the next time for a transmission in following data phase 452. In arbitration phase 451, a physical layer as in CAN and CAN FD is used. The physical layer corresponds to the bit transmission layer or layer 1 of the conventional OSI model (Open System Interconnection Model).

An important point during phase 451 is that the conventional CSMA/CR method is used, which allows for simultaneous access of subscriber stations 10, 20, 30 to bus 40 without destroying the higher-prioritized message 45, 46. This makes it relatively easy to add further bus subscriber stations 10, 20 30 to bus system 1, which is very advantageous.

The CSMA/CR method has the consequence that so-called recessive states must exist on bus 40, which are able to be overwritten by other subscriber stations 10, 20, 30 having dominant states on bus 40. In the recessive state, high-impedance conditions prevail at the individual subscriber station 10, 20, 30, which in combination with the parasites of the bus circuitry cause longer time constants. This leads to a limitation of the maximum bit rate of the current CAN-FD physical layer to approximately 2 megabits per second at present in a real vehicle application.

In data phase 452, in addition to a portion of control field 454, the user data of the CAN XL frame or message 45 from data field 455 as well as a checksum field 456 are transmitted. This is followed by DAS field 1520, which is used for the switchover from data phase 452 back to data phase 451.

A transmitter of message 45 begins a transmission of bits of data phase 452 onto bus 40 only if subscriber station 10 as the transmitter has won the arbitration and subscriber station 10 as the transmitter thus has exclusive access to bus 40 of bus system 1.

Quite generally, the following deviating properties are able to be realized in the bus system using CAN XL in comparison with CAN or CAN FD:

a) An assumption and possibly adaptation of proven properties that are responsible for the robustness and user friendliness of CAN and CAN FD, in particular the frame structure including an identifier and arbitration according to the CSMA/CR method, b) An increase in the net data transfer rate, in particular to approximately 10 megabits per second, c) An increase in the size of the user data per frame, in particular to approximately 2 kbytes or some random other value.

As illustrated in FIG. 2, in arbitration phase 451 as the first communication phase, subscriber station 10 partially, in particular up to and including the FDF bit, uses a format according to ISO 11898-1:2015 from CAN/CAN-FD. In contrast, beginning with the FDF bit, subscriber station 10 uses a CAN XL format, which is described in the following text, in the first communication phase and also in the second communication phase of data phase 452.

In the present exemplary embodiment, CAN XL and CAN FD are compatible. Here, the res bit from CAN FD, hereinafter also called XLF bit, is used for the switchover from the CAN FD format to the CAN XL format. For this reason, the frame formats of CAN FD and CAN XL are the same up to the res bit or XLF bit. Only at the res bit does a receiver recognize the format that is used to transmit frame 450. A CAN XL subscriber station, i.e., subscriber stations 10, 30 in this instance, also supports CAN FD.

As an alternative to frame 450 shown in FIG. 2, in which an identifier ID28 to ID18 with 11 bits is used, the use of a CAN XL extended frame format in which an identifier has 29 bits is optionally possible. Up to the FDF bit, this extended frame format is identical to the CAN FD extended frame format from the ISO 11898-1:2015.

According to FIG. 2, from the SOF bit up to and including the FDF bit, frame 450 is identical to the CAN FD base frame format according to the ISO11898-1:2015. For this reason, the conventional development is not described here in greater detail. Bits that are shown with a thick bar at their lower line in FIG. 2 are transmitted in frame 450 as dominant or '0'. Bits that are shown with a thick bar at their upper line in FIG. 2, are transmitted as recessive or '1' in frame 450. In the CAN XL data phase 452, symmetrical '1' and '0' levels are used instead of recessive and dominant levels.

In general, two different stuffing rules are applied when frame 450 is generated. Up to the FDF bit in arbitration field 453, the dynamic bit stuffing rule from CAN FD applies, which means that after five of identical bits in series, an inverse stuff bit is to be inserted. In data phase 452 up to the FCP field, a fixed stuffing rule applies, which means that a fixed stuff bit is to be inserted after a fixed number of bits. As an alternative, a number of two or more bits instead of only one stuff bit may be inserted as fixed stuff bits.

In frame 450, the FDF bit is directly followed by the XLF bit which, as mentioned above, corresponds to the 'res bit' in the CAN FD base frame format in terms of its position. If the XLF bit is transmitted as 1, i.e., as recessive, it thereby identifies frame 450 as a CAN XL frame. For a CAN FD frame, communication control device 11 sets the XLF bit as 0, i.e., as dominant.

After the XLF bit, a resXL bit follows in frame 450, which is a dominant bit for future use. The resXL must be transmitted as 0 for frame 450, that is, as dominant. However, if subscriber station 10 receives a resXL bit as 1, i.e., recessive, receiving subscriber station 10 transitions to a protocol exception state, for example, as it is done in a CAN FD message 46 for a res=1. As an alternative, the resXL bit could be defined precisely the other way around, that is, that it must be transmitted as 1, i.e., as recessive. In this case, the receiving subscriber station assumes the protocol exception state with a dominant resXL bit.

The resXL bit in frame 450 is followed by a sequence ADS (Arbitration Data Switch) in which a predetermined bit sequence is encoded. This bit sequence allows for a simple and reliable switchover from the bit rate of arbitration phase 451 (arbitration bit rate) to the bit rate of data phase 452 (data bit rate). The first bit of ADS field 1510 is the ADH bit. Optionally, a switchover of the operating mode of transceiver 12, 32 takes place within the ADH bit. Despite an optional operating mode switchover of the transceiver and the related level fluctuations during the ADH bit, the ADH bit is transmitted as a logical 1 on the bus, at least in its last part such as the final 50% of the bit. The ADH bit is the last bit of arbitration phase 451. The three following bits, DH1, DH2 and DL1, are already transmitted at the data bit rate. Thus, bits DH1, DH2 and DL1 in CAN XL are short bits of data phase 452 in terms of time. The bits DH1 and DH2 have the logical value 1 in each case. The last bit is the bit DL1, which has the logical value 0. After the bit-rate switchover, the receive nodes synchronize to the falling edge at the beginning of bit DL1. ADS field 1510 is used for the transition from first communication phase 451 to second communication phase 452.

Sequence ADS in frame 450 is followed by an SDT field which classifies the content of data field 455. The content of the SDT field indicates which type of information is included in data field 455. For instance, the SDT field indicates whether an "Internet Protocol" (IP) frame is included in data field 455 or a tunneled Ethernet frame or something similar.

Following the SDT field is an SEC field, which indicates whether frame 450 is secured by the CAN security protocol. The SEC field has the width of one bit and, like the SDT field, has the function of indicating which type of information is included in data field 455.

Following the SEC field is a DLC field. In the DLC field, the data length code (DLC) is inserted, which indicates the number of data bytes in data field 455 of frame 450. The number of data bytes in data field 455 may assume any value from 1 to the maximum number of bytes of data field 455 or the data field length. If the maximum data field length amounts to 2048 bits, in particular, then the data length code (DLC) requires 11 bits under the assumption that DLC=0 means a data field length with a number of 1 byte, and DLC=2047 means a data field length having a data field length of 2048 bytes. As an alternative, a data field 455 having the length 0 may be allowed, as in CAN, for example. In this case, DLC=0, for instance, would encode the data field length having a number of 0 bytes. The maximally encodable data field length with 11 bits, for example, is $(2^{11})-1=2047$ in that case.

An SBC bit counter field (stuff-bit counter) follows the DLC field in frame 450. In this field, the number of dynamic stuff bits is indicated that were transmitted in arbitration field 453. A receive node uses the information of the SBC bit-counter field to check whether the receive node has received the correct number of dynamic stuff bits.

After the SBC bit-counter field, a preamble checksum PCRC follows, also known as Preface CRC. The preamble checksum PCRC is a checksum for securing the frame format of frame 450, that is, all modifiable bits from the beginning of frame 450 by the SOF bit to the beginning of the preamble checksum PCRC, including all dynamic and optionally the fixed stuff bits up to the beginning of the preamble checksum PCRC. The length of preamble checksum PCRC and thus of the checksum polynomial according to the cyclical redundancy check (CRC) is to be selected according to the desired Hamming distance.

Following the preamble checksum PCRC in frame 450 is a field VCID (Virtual CAN Bus ID). The VCID field has a length of one byte. The number of a virtual CAN bus is included in the VCID field.

A field AF (Acceptance Field) follows the field VCID in frame 450. The AF field has a length of 32 bits. Included in the AF field is an address or some other value for the acceptance filtering.

Data field 455 (data field) follows field AF in frame 450. Data field 455 is made up of P bytes B, P being encoded in the DLC field, as described above. P is a natural number that is greater than or equal to 1.

Following data field 455 in frame 450 is checksum field 456 with a frame checksum FCRC and an FCP field. The frame checksum FCRC is made up of the bits of the frame checksum FCRC, which has 32 bits, for instance. The length of frame checksum FCRC and thus of the CRC polynomial is to be selected according to the desired Hamming distance. The frame checksum FCRC secures entire frame 450. As an alternative, only data field 455 is optionally secured by the frame checksum FCRC.

Following the frame checksum FCRC in frame 450 is the FCP field, where FCP=Frame Check Pattern applies. The FCP field is made up of four bits having the bit sequence 1100, in particular. A receive node checks with the aid of the FCP field whether the receive node is bit-synchronous with the transmission data flow. In addition, a receive node synchronizes to the falling edge in the FCP field.

Frame conclusion field 457 follows the FCP field. Frame conclusion field 457 is made up of two fields, i.e., DAS field 1520, and the acknowledge field or ACK field having the at least one bit ACK and the bit ACK-Dlm.

DAS field 1520 includes the sequence DAS (Data Arbitration Switch), in which a predetermined bit sequence is encoded. The bit sequence DAH, AH1, AL1 enables a simple and reliable switchover from the data bit rate of data phase 452 to the arbitration bit rate of arbitration phase 451. In addition, the operating mode of transceiver 12, 32 is switched over during DAS field 1520, optionally from an operating mode FAST to the operating mode SLOW. DAS field 1520 has the bits DAH, AH1, AL1, AH2 in FIG. 2. The bit AH2 is used to keep the distance from the acknowledge field (ACK). The DAS field has at least three bits. In the example of FIG. 2, the bit sequence of the sequence DAS has an arbitration bit DAH and an arbitration bit AH1, each having the logical value 1. Within the DAH bit, the physical layer, that is, the operating mode of transceiver 12, 32, is switched from FAST_TX or FAST_RX to SLOW. Following the bit AH1 is the bit AL1 (logical 0) and the bit AH2 (logical 1). With the aid of the two bits DAH and AH1 it is ensured that there is sufficient time for the operating mode switchover of transceiver 11, and that all subscriber stations 10, 30 see a recessive level of considerably more than an arbitration bit time ahead of the edge at the beginning of the AL2 bit (logical 0). This ensures a reliable synchronization of the subscriber stations of the bus system which are currently reintegrating themselves into the communication on the bus.

In frame conclusion field 457, the sequence of DAS field 1520 is followed by the acknowledgement field (ACK). Bits for an acknowledgment or non-acknowledgement of a correct receipt of frame 450 are provided in the acknowledgement field. In the example of FIG. 2, an ACK bit, which may alternatively be referred to as an ACK slot and optionally has more than one bit, and an ACK-dlm bit are provided. A NACK bit and a NACK-dlm bit may optionally be provided in addition. The receiving subscriber station 10, 30 transmits the ACK bit as dominant if it has correctly received frame 450. The transmitting subscriber station transmits the ACK bit as recessive. The ACK bit or the ACK slot is thus a placeholder for feedback from the receive nodes. For this reason, the bit originally transmitted onto bus 40 in frame 450 is able to be overwritten by the receiving subscriber stations 10, 30. The ACK-dlm bit is transmitted as a recessive bit, which is used for the separation from other fields. The NACK bit and the NACK-dlm bit are used to enable a receiving subscriber station to signal an incorrect receipt of frame 450 on bus 40. The function of the bits is similar to the function of the ACK bit and the ACK-dlm bit.

A frame conclusion field 457 in frame 450 is followed by an end field (EOF=End of Frame). The bit sequence of the end field (EOF) is used to mark the end of frame 450. The end field (EOF) ensures that a number of eight recessive bits is transmitted at the end of frame 450. This is a bit sequence that cannot occur within frame 450. As a result, subscriber stations 10, 20 are able to detect the end of frame 450 in a reliable manner.

The end field (EOF) has a length that differs as a function of whether a dominant bit or a recessive bit was seen in the ACK bit. If the transmitting subscriber station has received the ACK bit as dominant, then the end field (EOF) has seven recessive bits. In the other case, the end field (EOF) has a length of only five recessive bits.

Following the end field (EOF) in frame 450 is an inter-frame space (IFS), which is not shown in FIG. 2. This inter-frame space (IFS) is developed as in CAN FD according to the ISO11898-1:2015.

Figure 3:
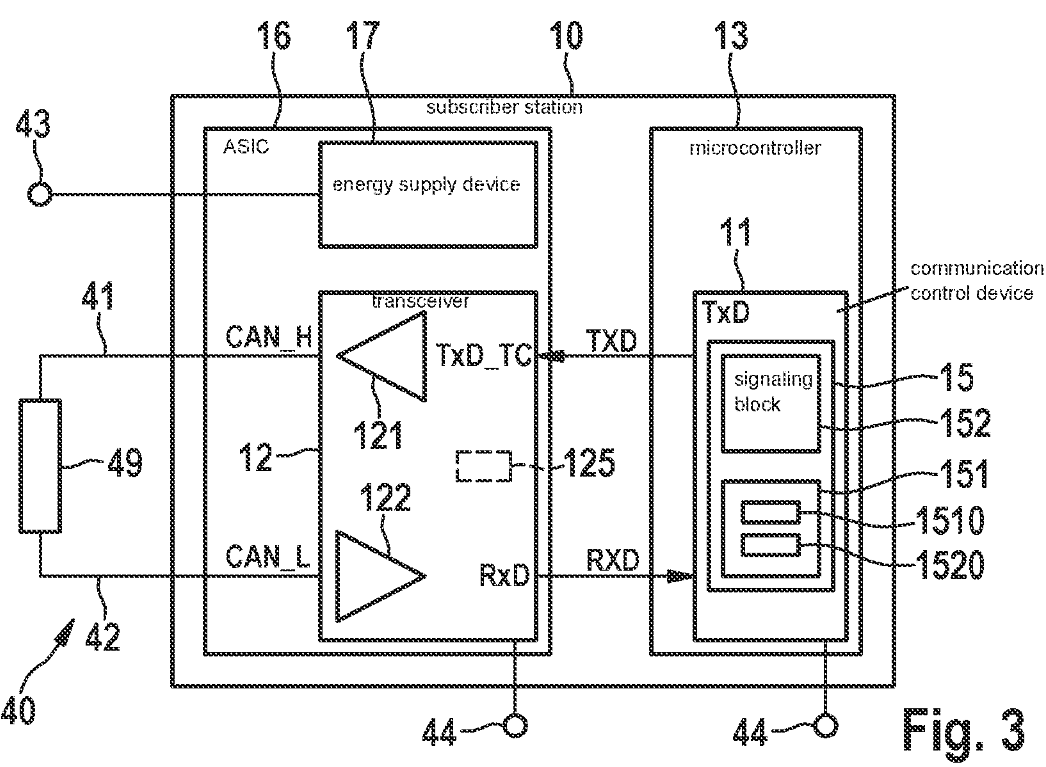
FIG. 3 shows a simplified, schematic block circuit diagram of a subscriber station of the bus system according to the first exemplary embodiment of the present invention.

FIG. 3 shows the basic structure of subscriber station 10 with communication control device 11, transceiver 12, and phase-error compensation module 15, which is part of communication control device 11. Subscriber station 30 has a development that is similar to the illustration in FIG. 3, but phase-error compensation module 35 according to FIG. 1 is situated separately from communication control device 31 and transceiver 32. Subscriber station 30 will therefore not be separately described.

According to FIG. 3, in addition to communication control device 11 and transceiver 12, subscriber station 10 has a microcontroller 13 to which communication control device 11 is assigned, and a system ASIC 16 (ASIC=Application-Specific Integrated Circuit), which may alternatively be a system basis chip (SBC) on which multiple functions required for an electronics subassembly of subscriber station 10 are combined. In addition to transceiver 12, an energy supply device 17 is installed in system ASIC 16, which supplies transceiver 12 with electric energy. Energy supply device 17 usually delivers a voltage CAN Supply of 5V. Depending on the requirement, however, energy supply device 17 is able to supply a different voltage of a different value. In addition or as an alternative, energy supply device 17 may be developed as a current source.

Phase-error compensation module 15 has an insertion block 151, which inserts predetermined DAS field 1520 and optionally also ADS field 1510 of FIG. 2 into frame 450, and a signaling block 152. Blocks 151, 152 will still be described in greater detail in the following text.

Moreover, transceiver 12 has a transmit module 121 and a receive module 122 and optionally a signal-improvement module 125.

Although mention is always made of transceiver 12 in the following text, it is alternatively possible to provide receive module 122 in a separate device outside of transmit module 121. Transmit module 121 and receive module 122 may be developed in the way of a conventional transceiver 22. Transmit module 121 may particularly include at least one operational amplifier and/or a transistor. Receive module 122 may particularly include at least one operational amplifier and/or a transistor.

Transceiver 12 is connected to bus 40, or more precisely, to its first bus core 41 for CAN_H or CAN XL_H, and to its second bus core 42 for CAN_L or CAN XL_L. Via at least one connection 43, the voltage supply for energy supply device 17 is implemented for the supply of first and second bus core 41, 42 with electric energy, in particular with the CAN supply voltage. The connection to ground or CAN_GND is realized via a connection 44. First and second bus core 41, 42 are terminated by a termination resistor 49.

First and second bus core 41, 42 are connected in transceiver 12 not only to transmit module 121, which is also called a transmitter, but also to receive module 112, which is also called a receiver, even if the connection is not shown in FIG. 3 for reasons of simplification.

While bus system 1 is in operation, transmit module 121 converts a transmit signal TXD or TxD of communication control device 11 into corresponding signals CAN-XL_H and CAN-XL_L for bus cores 41, 42 and transmits these signals CAN-XL_H and CAN-XL_L onto bus 40 at the connections CAN_H and CAN_L.

Figure 4:
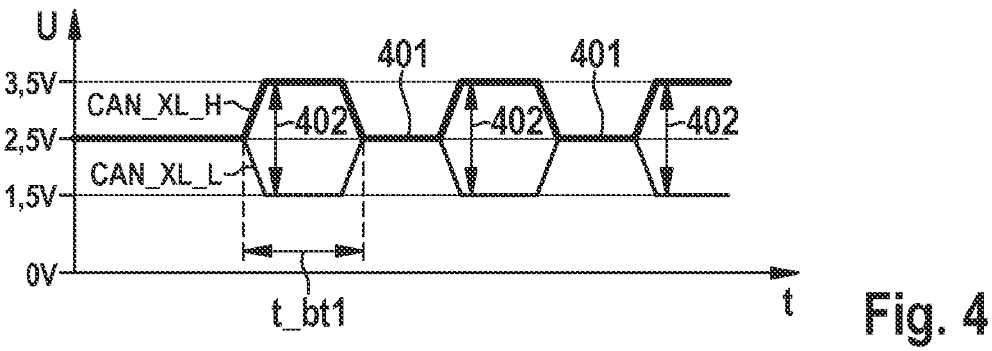
FIG. 4 shows a time characteristic of bus signals CAN-XL_H and CAN-XL_L at the subscriber station according to the first exemplary embodiment of the present invention.

Receive module 122 uses the signals CAN-XL_H and CAN-XL_L received from bus 40 to form a receive signal RXD or RxD according to FIG. 4 and forwards it to communication control device 11, as illustrated in FIG. 3. With the exception of an idling or standby state, transceiver 12 having receive module 122 always listens for a transmission of data or messages 45, 46 on bus 40 in a normal operation, regardless of whether or not transceiver 12 is the transmitter of message 45.

According to the example of FIG. 4, signals CAN-XL_H and CAN-XL_L have the dominant and recessive bus levels 401, 402, as from CAN, at least in arbitration phase 451. A differential signal VDIFF=CAN-XL_H-CAN-XL_L forms on bus 40, which is shown in Fig. for arbitration phase 451. The individual bits of signal VDIFF having the bit time t_bt1 are able to be detected in arbitration phase 451 by a receive threshold T a of 0.7 V, for example. In data phase 452, the bits of signals CAN-XL_H and CAN-XL_L are transmitted more rapidly, i.e., at a shorter bit time t_bt2, than in arbitration phase 451. This is described in greater detail with the aid of FIG. 6 to FIG. 9. Thus, signals CAN-XL_H and CAN-XL_L differ from conventional signals CAN_H and CAN_L in data phase 452 at least by their faster bit rate.

Figure 5:
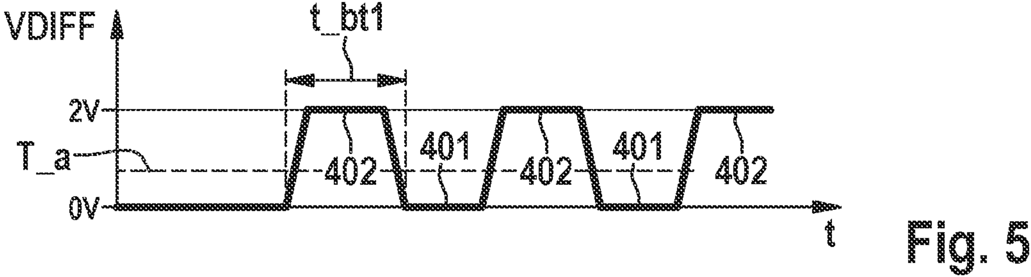
FIG. 5 shows a time characteristic of a differential voltage VDIFF of the bus signals CAN-XL_H and CAN-XL_L at the subscriber station according to the first exemplary embodiment of the present invention.

The sequence of states 401, 402 for signals CAN-XL_H, CAN-XL_L in FIG. 4 and the resulting characteristic of voltage VDIFF of FIG. 5 is merely meant to illustrate the function of subscriber station 10. The sequence of the data states for bus states 401, 402 is selectable according to the requirements.

The optionally provided signal-improvement module 125 is developed to execute an SIC function (SIC=Signal Improvement Capability). The SIC function induces an acceleration of the transition of differential voltage VDIFF on the bus cores from dominant (401 of FIG. 5) to recessive (402 of FIG. 5) in arbitration phase 451. Signal-improvement module 125 triggers the SIC function during a transition from 0 to 1 at the TXD input of transceiver 12. The SIC function (SIC=Signal Improvement Capability) is active only during the first operating mode B_451 (SLOW) with dominant and recessive signal states.

In other words, according to FIG. 4, when switched into a first operating mode B_451 (SLOW), transmit module 121 according to FIG. 4 generates a first data state as bus state 402 with different bus levels for two bus cores 41, 42 of the bus line and a second data state as bus state 401 with the same bus level for the two bus cores 41, 42 of the bus line of bus 40.

In addition, for the time characteristics of the signals CAN-XL_H, CAN-XL_L in a second operating mode B_452_TX (FAST_TX), which includes data phase 452, transmit module 121 transmits the bits onto bus 40 at a higher bit rate. In data phase 452, the CAN-XL_H and CAN-XL_L signals may furthermore be generated by a different physical layer than in CAN FD. This makes it possible to increase the bit rate in data phase 452 even further than in CAN FD. A subscriber station which is not a transmitter of frame 450 in data phase 452 adjusts a third operating mode B_452_RX (FAST_RX) in its transceiver.

To signal the switchover from the operating mode B_451 to the operating mode B_452_TX (FAST_TX) or operating mode B_452_RX (FAST_RX), communication control device 11 performs a pulse-width modulation (PWM) of transmit signal TxD. For this purpose, communication control device 11 uses one or more PWM symbol(s) per logic bit of CAN XL frame 450. As a matter of principle, a PWM symbol is made up of two phases, i.e., a 0 phase and a 1 phase. In addition, a PWM symbol is restricted by two identical edges, e.g., by two rising edges.

Phase-error compensation module 15 of FIG. 3, in particular its insertion block 151, is used for inserting DAS field 1520 and optionally also ADS field 1510 of FIG. 2 into frame 450 if subscriber station 10 acts as a transmitter of frame 450. In addition, phase-error compensation module 15, in particular its signaling block 152, is able to perform the pulse-width modulation (PWM) in the manner described in the following text for the switchover between the operating modes B_451 (SLOW) and B_452_TX (FAST_TX).

Figures 6, 7, 8:
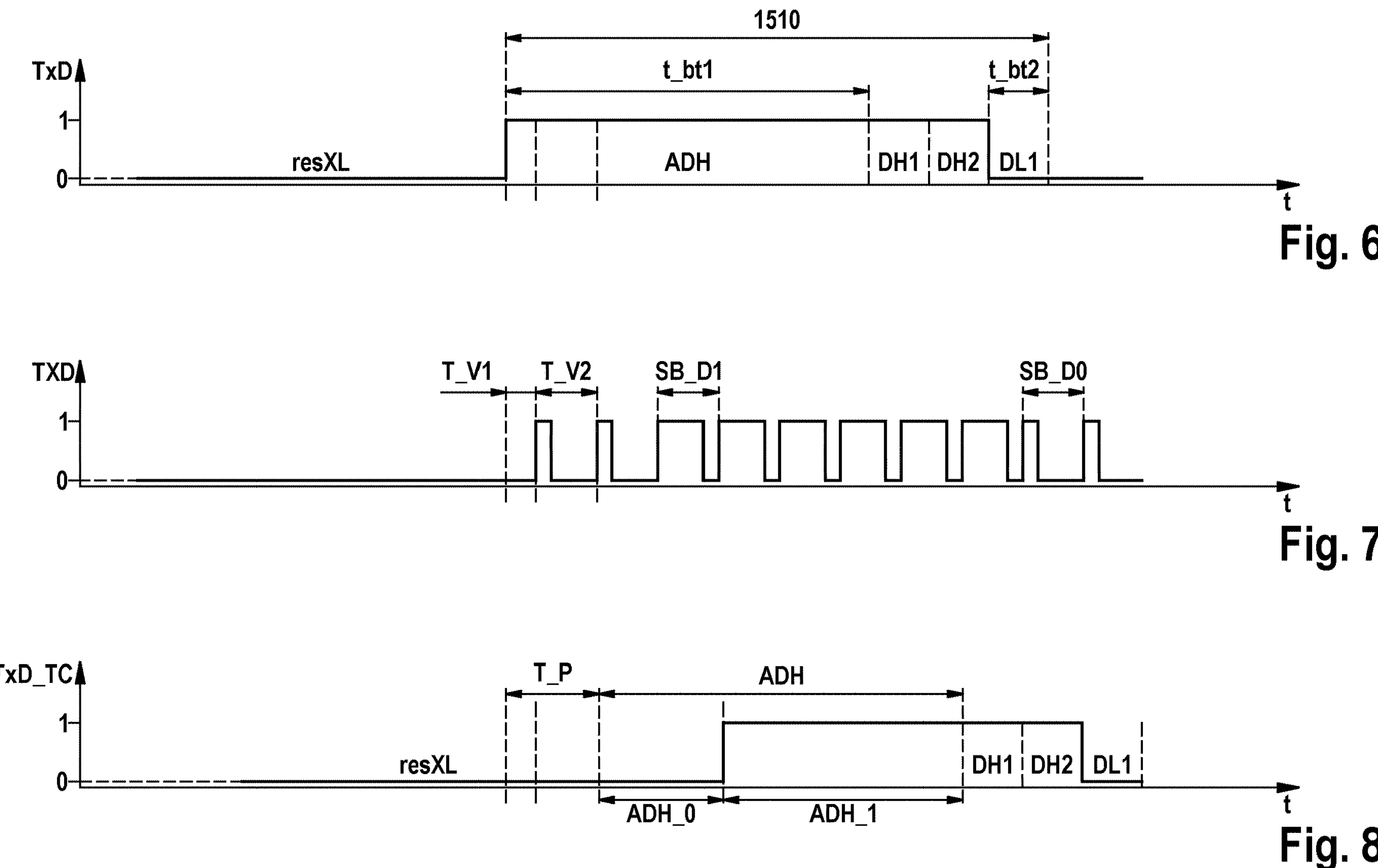
FIG. 6 through FIG. 8 show, in each case, a time characteristic of a signal that occurs at connections of the subscriber station in the transmission of a frame according to the first exemplary embodiment if the subscriber station is a transmitter of the message upon whose transmission a switchover of the operating mode of the transceiver from a first communication phase to a second communication phase takes place.

FIG. 6 shows, over time t, the resulting digital transmit signal TxD in the region of the switchover from arbitration phase 451 to data phase 452 of a frame 450, or in other words, during the transition from phase 451 to phase 452. After bit resXL, ADS field 1510 is inserted into frame 450. Transmit signal TxD is serially transmitted by communication control device 11 as the transmitter of frame 450 to transceiver 12, as described in greater detail in the following text. Up to and including the bit ADH, the bits of frame 450 have a bit period t_bt1. Starting with bit DH1, the first bit of data phase 452, the bits of frame 450 have a bit period t_bt2. Bit period t_b2 in the example of FIG. 6 is shorter than bit duration t_bt1.

As already illustrated in FIG. 2 and also in FIG. 6, the ADH bit in the present exemplary embodiment is transmitted with the logical value 1.

FIG. 7 shows the states which result from transmit signal TxD over time t and occur in series at the connection TXD between communication control device 11 and transceiver 12. To this end, communication control device 11, for instance phase-error compensation module 15, in particular signaling block 152, carries out the pulse-width modulation (PWM) of transmit signal TxD of FIG. 6 in the ADH bit and in data phase 452. More precisely, the pulse-width modulation (PWM) of transmit signal TxD of FIG. 6 begins with the ADH bit. In arbitration phase 451 before the ADH bit, no pulse-width modulation (PWM) of transmit signal TxD is carried out.

Because of the high frequency of the edges of the signal at the TXD connection, the transceiver recognizes that transceiver 12 is to change from the operating mode B_451 of the arbitration phase to one of the faster operating modes B_452_TX (FAST_TX), B_452_RX (FAST_RX) and is also to remain there. Based on the value of the previously transmitted resXL bit, transceiver 12 recognizes whether it is to change to the operating mode B_452_TX (FAST_TX) or to the operating mode B_452_RX (FAST_RX). In addition or as an alternative, based on the value of the first PWM symbol or the S first PWM symbols, transceiver 12 understands to which operating mode it is meant to switch. S is a natural number that is greater than or equal to 1. The signal at the connection TXD is delayed by a time period T_V1 in comparison to the TxD signal due to the performed PWM encoding. Signaling block 152 generates the first S PWM symbols according to the operating mode to which the transceiver is to be switched. The first S PWM symbols are thus not encoded as a function of the value of the ADH bit. In addition or as an alternative, the first S PWM symbols may be used in the transmit node to achieve a stepwise transition of differential voltage VDIFF on bus 40 from dominant +2V over differential voltage VDIFF of +1V for the logical 0 in data phase 452 to the differential voltage VDIFF of −1V for the logical 1 in data phase 452.

In the example in FIG. 7, the 0 phase in a PWM symbol SB_D0 is longer than the 1 phase, which corresponds to a bit in data phase 452 having the logical value 0 in transmit signal TxD. In contrast, in a PWM symbol SB_D1, the 1 phase is longer than the 0 phase, which corresponds to a bit having the logical value 1. It is of course possible that PWM symbols SB_D0, SB_D1 are defined differently, in particular exactly the other way around than described above.

In addition, in the example of FIG. 7, the first two PWM symbols in the signal at the connection TXD have the logical value 0 (SB_D0). Transceiver 12, 32 evaluates the first two PWM symbols in order to decide to which operating mode transceiver 12, 32 is to be switched. In the present example of FIG. 7, transceiver 12, 32 of the transmit node is meant to switch to the operating mode B_452_TX (FAST_TX) because of the two PWM symbols having the logical value 0. The switchover to operating mode B_452_RX (FAST_RX) is signaled by at least one other value of the two first PWM symbols in the ADH bit.

As illustrated in FIG. 7, communication control device 11, e.g., phase-error compensation module 15, in particular signaling block 152, performs the subsequent pulse-width modulation (PWM) of the ADH bit of transmit signal TxD of FIG. 6 in such a way that all following PWM symbols of the ADH bit are transmitted with the logical value 1. As a result, only symbols SB_D1 are present in the second part of the ADH bit, the part following the signaling of the type of operating mode B_452 of transceiver 12, 32 for data phase 452.

FIG. 8 shows the time characteristic of a signal TxD_TC, which was decoded by transceiver 12 from the states at connection TXD of FIG. 7. In the example of FIG. 8, transceiver 12 switches its operating mode B_451, in which frame 450 has bits featuring the bit period t_bt1, to operating mode B_452_TX (FAST_TX) in the bit ADH, in which frame 450 has bits featuring the bit period t_bt2. In addition, in operating mode B_451, the bits of frame 450 are able to be transmitted onto bus 40 with a different physical layer than in the operating mode B_452_TX, as described above.

Transceiver 12 thus decodes the states at connection TXD of FIG. 7 into the signal TxD_TC according to FIG. 8. For the ADH bit, a logical value 0 results for the first part ADH_0 of the ADH bit. For the second and last part ADH_1 of the ADH bit in FIG. 8, a logical value 1 results.

Each one of the PWM symbols SB_D0, SB_D1 at the connection TXD is able to be decoded only at the end of the respective PWM symbol SB_D0, SB_D1. Thus, the decoding in transceiver 12 inserts an additional delay time period T_V2 into the signal TxD_TC to be serially transmitted onto bus 40. Delay time period T_V2 is equal to the time period of a symbol length of one of the PWM symbols SB_D0, SB_D1, as shown in FIG. 8. Phase error T_P, which is produced by the PWM encoding and decoding in the transmitting subscriber station, is T_P=T_V1+T_V2.

Figures 9, 10, 11, 12, 13:
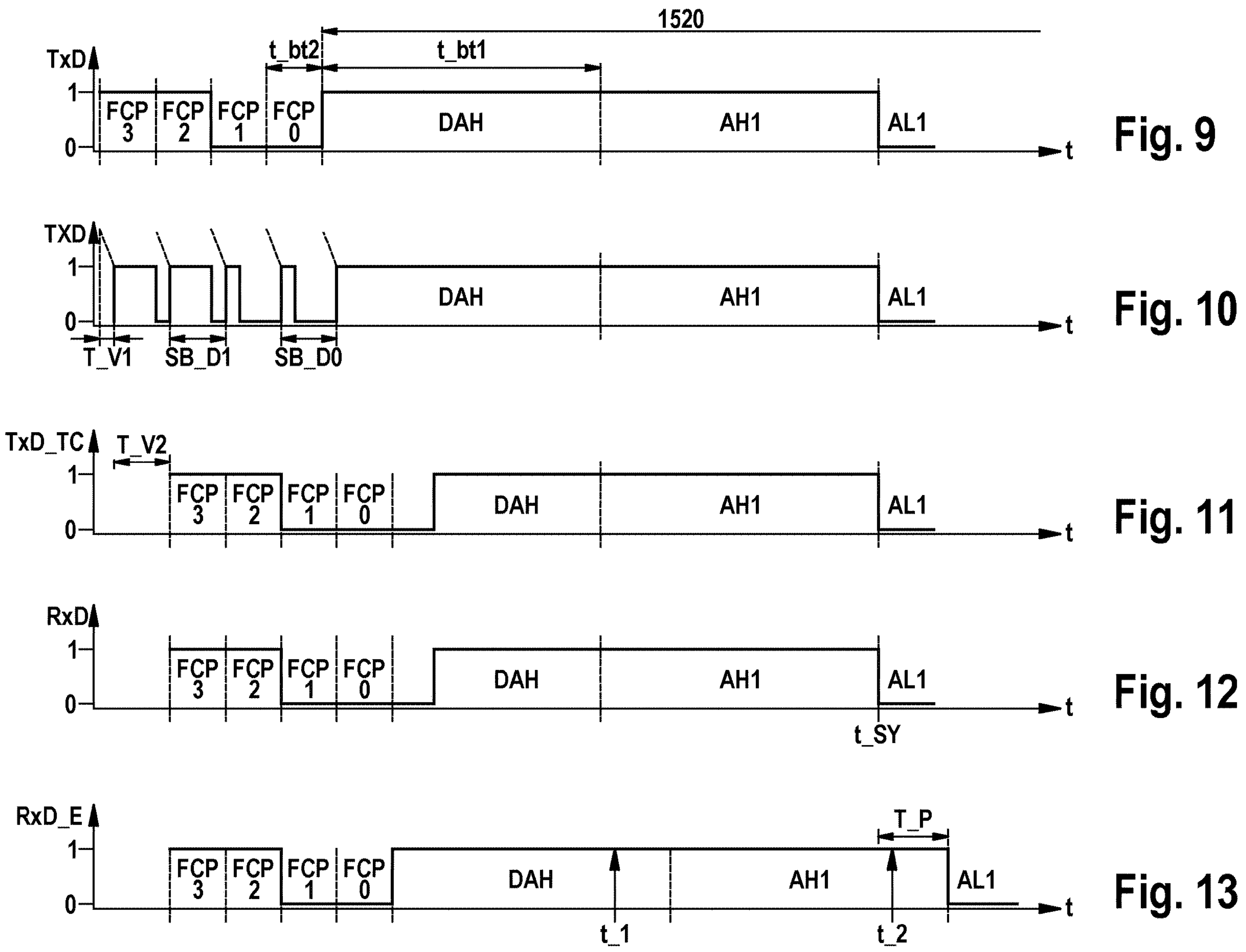
FIG. 9 through FIG. 11 show a time characteristic of a signal that occurs at connections of the subscriber station according to the first exemplary embodiment when a frame is transmitted if the subscriber station is a transmitter of the message upon whose transmission a switchover of the operating mode of the transceiver from the second communication phase to the first communication phase takes place.
FIG. 12 shows the time characteristic of signal states that a receive node observes at its receive connection as a receive signal if another subscriber station is the transmitter of the message and generates signals according to FIG. 9 through FIG. 11 in the process.
FIG. 13 shows the time characteristic of signal states that a receive node expects at its receive connection as a receive signal if another subscriber station is a transmitter of the message and generates signals according to FIG. 9 through FIG. 11 in the process.

After transceiver 12 has decoded the states at the connection TXD of FIG. 9 into the signal TxD_TC according to FIG. 8, transceiver 12 transmits signal TxD_TC onto bus 40 as differential voltage VDIFF. Differential voltage VDIFF based on signal TxD_TC is able to be received by a receive node on bus 40. The associated signal in the receive node is not shown here.

The pulse-width modulation (PWM) of transmit signal TxD ends after data phase 452. The switchover from the operating mode B_452_TX (FAST_TX) or the operating mode B_452_RX (FAST_RX) to the operating mode B_451 (SLOW) is signaled via the deactivation of the PWM encoding and thus via the absence of the many edges.

FIG. 9 shows, over time t, the resulting digital transmit signal TxD in the region of the switchover from data phase 452 of frame 450 to arbitration phase 451. After bits FCP3, FCP2, FCP1, FCP0, DAS field 152 is inserted in frame 450. Up to and including the bit FCP0, the last bit of data phase 452, the bits of frame 450 still have the bit period t_bt2. Starting with bit DAH, the first bit of following arbitration phase 451, the bits of frame 450 have the bit period t_bt1. As already described with reference to FIG. 6, bit period t_b2 in the example described here is shorter than bit period t_bt1.

As illustrated in FIG. 2 and also in FIG. 9, the DAH bit and the following AH1 bit in the current exemplary embodiment are transmitted in frame 450 with the logical value 1.

FIG. 10 shows the states that result over time t from transmit signal TxD, which serially occur at the connection TXD between communication control device 11 and transceiver 12. As described above, communication control device 11, for instance phase-error compensation module 15, in particular signaling block 152, performs the pulse-width modulation (PWM) of transmit signal TxD of FIG. 9 in data phase 452. The PWM encoding and subsequent PWM decoding in the transceiver cause delays T_V1, T_V2, as described above.

The pulse-width modulation (PWM) of transmit signal TxD of FIG. 9 ends with the FCP0-bit, that is to say, before the DAH bit. In arbitration phase 451, i.e., after the FCP0 bit, no pulse-width modulation (PWM) of transmit signal TxD takes place according to the signal TXD of FIG. 10.

Based on the now lower frequency as the result of the missing many edges of the signal at the TXD connection, transceiver 12 detects at the end of data phase 452 that transceiver 12 is to switch from the operating mode of data phase 452 to the operating mode B_451 of the arbitration phase where it should also remain. In operating mode B_451, transceiver 12 no longer carries out a PWM decoding of signal TxD of FIG. 10. As a result, during the DAH bit the delays T_P=T_V1+T_V2 in signal TXD_TC of FIG. 11 that were included in the signal TxD_TC during data phase 452 due to the PWM encoding and PWM decoding of signal TxD are omitted. The AH1 bit in the signal TxD_TC of FIG. 11 thus ends earlier, by T_P=T_V1+T_V2, which leads to a phase error of T_P at the receiver.

In the example of FIG. 11, transceiver 12 switches its operating mode B_452_TX (FAST_TX) of data phase 452 to the operating mode B_451 in which frame 450 has bits of the bit period t_bt1. In addition, the physical layer is able to be switched over, as described above.

As illustrated in FIG. 12, during data phase 452, communication control device 11 (protocol controller) is synchronized in a receive node to the edges of digital signal RxD received from the transmit node. If the transmit node stops the PWM encoding starting with the DAH bit, as described above with reference to FIG. 9 to FIG. 10, the runtime from the transmit node to the receive node is shortened by T_P=T_V1+T_V2. This suddenly introduced phase error at the receiver (receive node) corresponds to a phase jump.

However, the receive node expects the end of the AH1 bit later, by T_P=T_V1+T_V2, as illustrated by the digital signal RxD_E in FIG. 13.

As a result of the phase jump, the AH1 bit at the receive node according to FIG. 12 ends T_P=T_V1+T_V2 earlier than expected by the receive node according to the signal RxD_E of FIG. 13. To compensate for this phase jump, phase-error compensation module 15 and phase-error compensation modules 25, 35 of subscriber stations 10, 20, 30 proceed in the following manner.

The receive node, more precisely, its communication control device 11, samples receive signal RxD at instants t_1, t_2 according to the current synchronization in the signal RxD_E of FIG. 13. Sampling instant t_1 is the sampling instant of the DAH bit. Sampling instant t_2 is the sampling instant of the AH1 bit.

Phase-error compensation module 15, 25, 35 in associated subscriber station 10, 20, 30 as the receive node tolerates one to two bits sampled in direct succession with the logical value 1 starting with the bit position of DAH. The first bit that is subsequently sampled with the logical value 0 is accepted as AL1 bit.

In the example of FIG. 12 and FIG. 13, the receive node samples the signal RxD of FIG. 12 as the bit sequence DAH, AL1. The AH1 bit is therefore missing. Nevertheless, phase-error compensation module 15, 25, 35 of the receive node tolerates the lack of the AH1 bit.

Quite generally, phase-error compensation module 15, 25, 35 of the receive node assumes that the first falling edge after the DAH bit defines the beginning of the AL1 bit. All receive nodes synchronize to the edge at the beginning of the AL1 bit, which corresponds to the instant t_SY in FIG. 12.

In addition, the hard synchronization is activated when the DAH bit is sampled as logic 1. Thus, a hard synchronization is performed at the next edge, that is, a synchronization which is able to correct phase errors of random magnitudes. The hard synchronization is performed at the instant t_SY, as shown in FIG. 12.

Moreover, phase error compensation module 15, 25, 35 of the receive node is developed in such a way that a sampling of the DAH bit as logic 0 is evaluated as a format error. In such a case, a frame sampled in this way is evaluated as faulty and/or rejected as invalid. An error frame 47 may additionally be transmitted onto bus 40.

This ensures that the receive node compensates for the phase jump caused by the runtime shortening and a possible lack of the AH1 bit by a suitable synchronization after the switchover from data phase 452 to arbitration phase 451.

According to a modification of the above-described DAS field, the DAS field may even have more than the described four bits at its end. However, four bits are advantageous with regard to maximizing the net data rate.

In addition or as an alternative, it is possible that at least one of subscriber stations 10, 20, 30 is developed to ensure that a stable recessive level comes about on bus 40 up to the sampling point t_1 of the DAH bit according to FIG. 13.

To this end, for example, the above-described signal-improvement module 125 in the transceiver 12 is developed to execute the SIC function (SIC=Signal Improvement Capability) not only in the operating mode B_451 (SLOW) during the transition of the TxD signal from 0 to 1. This first trigger condition for the execution of the SIC function has been described earlier. In addition or as an alternative, the above-described signal-improvement module 125 may be designed to enable a second trigger condition for the execution of the SIC function.

The second trigger condition for executing the SIC function is a change of transceiver 12, 22, 32 of the transmit node from the operating mode 452_TX (FAST_TX) to the operating mode B_451 of arbitration phase 451, as shown in FIG. 9. The SIC function executed by signal-improvement module 125 in response causes an acceleration of the transition from the bus levels of data phase 452 to the recessive level of arbitration phase 451. The second trigger condition for the execution of the SIC function is independent of the manner in which communication control device 11 signals the change in operating mode to the transceiver.

This advantageously makes it possible to ensure in a reliable manner that the receive nodes can sample the DAH bit as logical 1.

Another advantage of the described development of signal-improvement module 125 is that the accelerated transition from the levels of data phase 452 to the recessive level of arbitration phase 451 allows for the use of larger CAN topologies on account of the SIC function. In an advantageous manner, signal-improvement module 125 also makes it possible to dispense with a separate consideration of the described level transitions in the configuration of the topologies.

If no operating-mode switchover of transceivers 12, 32 is to take place, there will also be no pulse-width modulation (PWM) for an encoding of the signaling for transmit signal TxD of FIG. 6. As a result, the signal which transceiver 12, 32 drives onto bus 40 as differential voltage VDIFF when transceiver 12, 32 acts as a transmit node, is identical to transmit signal TxD of FIG. 6. Since no PWM encoding and thus also no decoding takes place, no one-time phase error T_P is generated between transmit signal TxD_TC in transceiver 12, 32 and transmit signal TxD.

Figure 14:
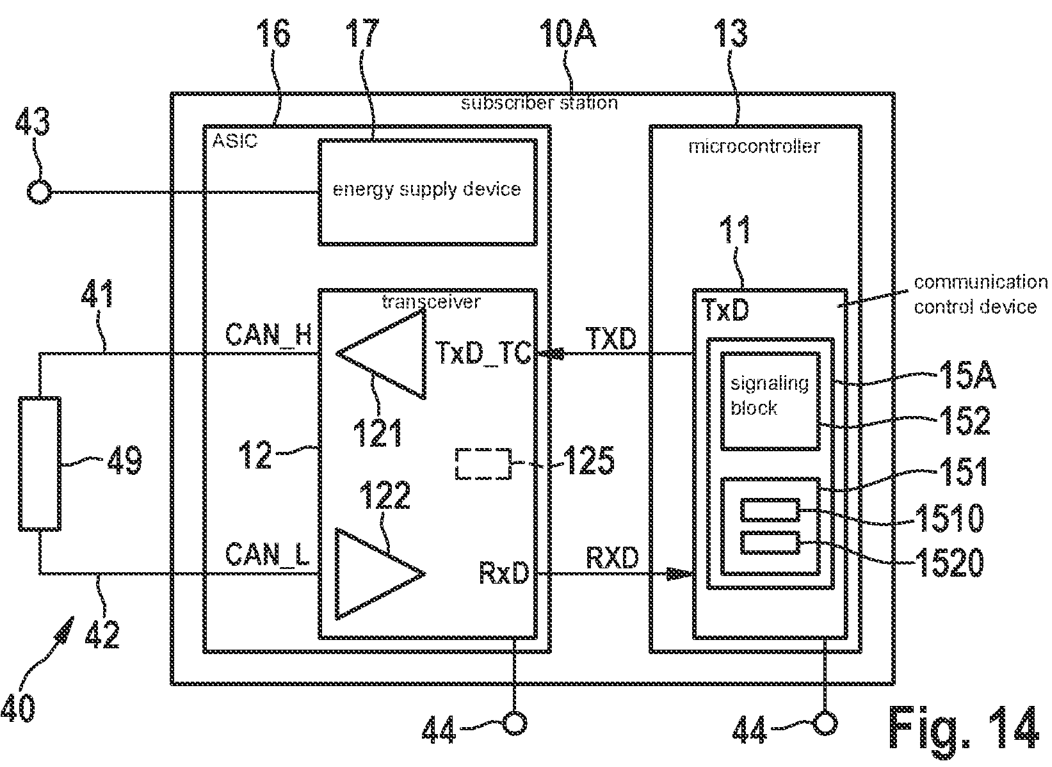
FIG. 14 shows a schematic block circuit diagram of a subscriber station of the bus system according to a second exemplary embodiment.

FIG. 14 shows a subscriber station 10A having a phase-error compensation module 15A according to a second exemplary embodiment. With the exception of phase-error compensation module 15A, subscriber station 10A has the same development as subscriber station 10 according to the preceding exemplary embodiment.

Phase-error compensation module 15A is developed in such a way that it tolerates a value of DAH=0 when subscriber station 10A acts as a receive node.

In other words, if the DAH bit in the signal RxD of FIG. 12 is sampled as logic 0 although the DAH bit according to FIG. 13 in the signal RxD_E should actually be logic 1, then phase-error compensation module 15A tolerates such a DAH bit.

However, phase-error compensation module 15A is developed in such a way that a sampling of neither the DAH bit nor the AH1 bit as logic 1 is evaluated as a format error. In this case, such a sampled frame is evaluated as faulty and/or rejected as invalid. In addition, an error frame 47 is able to be sent onto bus 40.

In addition, the hard synchronization or the synchronization is activated when the DAH bit or the AH1 bit is sampled as logical 1. Here, too, a synchronization, which is able to correct phase errors of various magnitudes, thus takes place at instant t_SY of FIG. 12.

In this manner as well, it is ensured that subscriber station 10A as the receive node compensates for the phase jump brought about by the runtime shortening and also a possible lack of the AH1 bit after the switchover from data phase 452 to arbitration phase 451 by a suitable synchronization.

The advantage of such a compensation of the phase jump in the second exemplary embodiment is that more time is available for the transition on bus 40 from the level of data phase 452 to the recessive level of arbitration phase 451.

Figure 15:
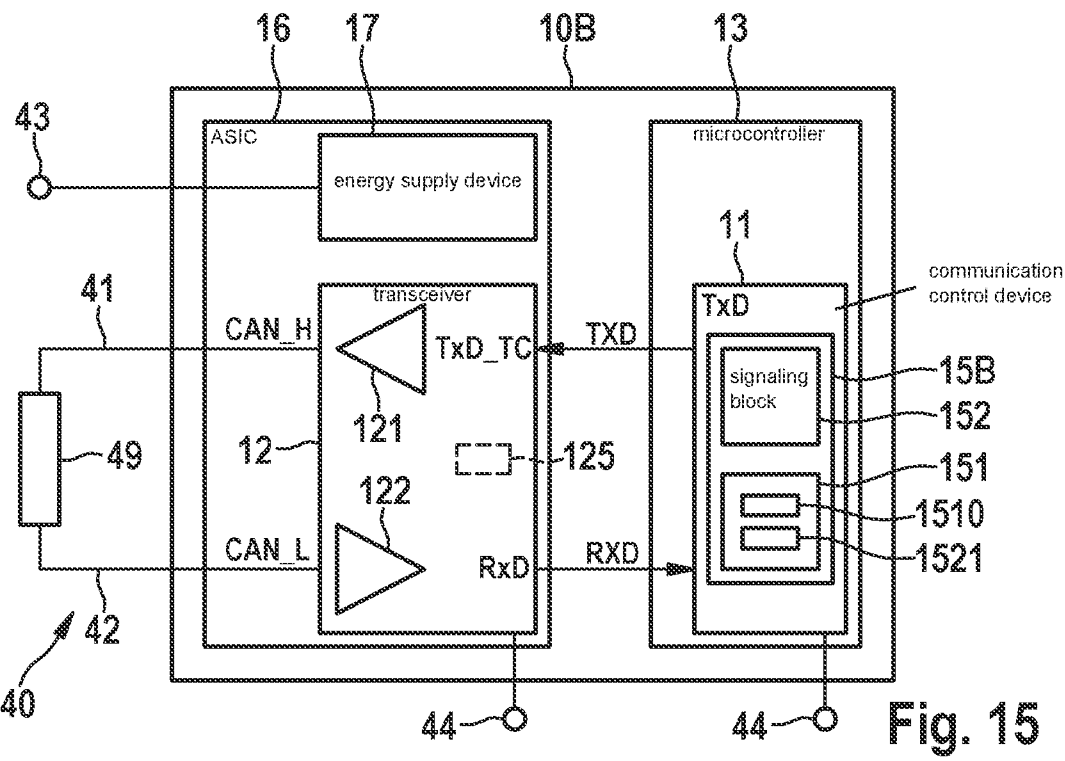
FIG. 15 shows a schematic block circuit diagram of a subscriber station of the bus system according to a third exemplary embodiment of the present invention.

FIG. 15 shows a subscriber station 10B having a phase-error compensation module 15B according to a third exemplary embodiment. With the exception of phase-error compensation module 15B, subscriber station 10B has the same structure as subscriber station 10 according to the first exemplary embodiment.

Phase-error compensation module 15B is developed in such a way that it ignores the DAH bit if subscriber station 10B acts as a receive node. Phase-error compensation module 15A is furthermore developed to insert a modified DAS field 1521 in frame 450, as shown in FIG. 16, if subscriber station 10B acts as a transmit node.

Modified DAS field 1521 has the five bits DAH, AH1, AH1B, AL1, AH2. In contrast to the DAS field of FIG. 2, DAS field 1521 thus has an additional bit in the frame format, that is, bit AH1B.

In addition, if subscriber station 10B acts as a receive node, phase-error compensation module 15B is developed to tolerate one to two bits sampled in direct succession with the logical value 1, beginning with the bit position of AH1. When the AH1 bit is sampled as logical 1, phase-error compensation module 15B activates the hard synchronization. The hard synchronization is carried out at the instant t_SY, as illustrated in FIG. 12.

However, phase-error compensation module 15B is developed to evaluate a sampling of the AH1 bit as logicalyl 0 as a format error. In this case, such a sampled frame is evaluated as faulty and/or rejected as invalid. An error frame 47 is able to be transmitted onto bus 40 in addition.

The advantage of such a compensation of the phase jump is that more time is available for the transition on bus 40 from the level of data phase 452 to recessive level 402 of arbitration phase 451. However, because of the additional bit AH1B, DAS field 1521 produces a greater overhead of control bits. The net data rate is thereby reduced in comparison with the preceding exemplary embodiments.

All above-described developments of subscriber stations 10, 20, 30 of bus system 1 and the method executed therein may be used individually or in all possible combinations. In particular, all features of the above-described exemplary embodiments and/or their modifications are able to be combined as desired. In addition or as an alternative, the following modifications are possible, in particular.

Although the present invention has been described using the example of the CAN bus system in the text above, the present invention is able to be used in any communication network and/or communication method in which two different communication phases are used in which the bus states generated for the different communication phases differ. In particular, the present invention can be used in developments of other serial communication networks such as Ethernet and/or 100 Base-T1 Ethernet, field bus systems, etc.

Bus system 1 according to the exemplary embodiments may particularly be a communication network in which data are serially transmittable at two different bit rates. It is advantageous but not a mandatory precondition that an exclusive, collision-free access of a subscriber station 10, 20, 30 in bus system 1 to a shared channel is ensured at least for specific time periods.

It is of course possible that ADS field 1510 has more than the indicated bits ADH to DH2 that were described in the exemplary embodiments. Alternatively or additionally, DAS field 1520 may have more than the mentioned bits DAH to AH2 described in the exemplary embodiments.

The number and positioning of subscriber stations 10, 20, 30 in bus system 1 of the exemplary embodiments can be freely selected. In particular, subscriber station 20 may be omitted in bus system 1. It is possible that one or more of subscriber station(s) 10 or 30 is/are provided in bus system 1. It is possible that all subscriber stations in bus system 1 have the same development, that is, only subscriber station 10 or only subscriber station 30 is provided.

What is claimed is:

1. A subscriber station for a serial bus system, comprising:

a communication control device configured to control communication of the subscriber station with at least one other subscriber station of the bus system;

wherein:

a bit time in a first communication phase of the bus system can differ from a bit time in a second communication phase of the bus system;

the communication control device is configured to sample and evaluate, according to a predetermined frame format, a signal received from a bus of the bus system, the sampled signal being based on a transmit signal generated by another subscriber station;

the predetermined frame format includes a predetermined field that (a) indicates a transition from the second communication phase to the first communication phase and (b) includes two or three bits having a logical value of 1 between a beginning of the predetermined field and a following falling edge of the predetermined field;

during the evaluation, the communication control device is configured to determine that a sampled bit sequence of the sampled signal constitutes a valid instance of the predetermined frame format by recognizing the predetermined field as present and valid, independently of whether only one bit or two consecutive bits having the logical value 1 were sampled between the beginning of the predetermined field and the following falling edge of the predetermined field in the sampled signal; and the communication control device is configured to perform synchronization at the falling edge of the predetermined field of the valid instance of the predetermined frame format in the sampled signal.

2. The subscriber station as recited in claim 1, wherein:

the predetermined field has four bits with the bit time of the first communication phase, wherein the predetermined field has a bit sequence with a logical value 1101, and wherein the communication control device is configured to, after sampling, in the sampled signal, a bit having the logical value 1 between the beginning of the predetermined field and the following falling edge of the predetermined field, evaluate a next bit which is sampled with a logical value 0 in the sampled signal and which is sampled at the latest for a third bit of an expected bit sequence 1101, as the third bit of the expected bit sequence 1101.

3. The subscriber station as recited in claim 2, wherein the communication control device is configured to evaluate a frame which the communication control device has sampled from the sampled signal as faulty when neither the first bit nor the second bit of the predetermined field was sampled as logic 1.

4. The subscriber station as recited in claim 3, wherein the communication control device is configured to evaluate a frame which the communication control device has sampled from the sampled signal as not faulty but valid with regard to the predetermined field:

i) when the first bit of the predetermined field was sampled as logic 0 and the second bit of the predetermined field was sampled as logic 1, or ii) when the first bit of the predetermined field was sampled as logic 1 and the second bit of the predetermined field was sampled as logic 0.

5. The subscriber station as recited in claim 3, wherein the communication control device is configured to activate a hard synchronization or a synchronization when the first bit of the predetermined field is sampled as logic 1 or when the second bit of the predetermined field is sampled as logic 1.

6. The subscriber station as recited in claim 1, wherein the communication control device is configured to evaluate as faulty a frame which the communication control device has sampled from the sampled signal when the first bit of the predetermined field was not sampled as logic 1.

7. The subscriber station as recited in claim 1, wherein the communication control device is configured to activate a hard synchronization when the first bit of the predetermined field is sampled as logic 1.

8. The subscriber station as recited in claim 1, wherein:

the predetermined field has five bits with the bit time of the first communication phase, the predetermined field has a bit sequence with a logical value 11101, and the communication control device is configured to, after sampling a bit with the logical value 1 for a second bit of the bit sequence in the sampled signal, to evaluate a next bit that is sampled in the sampled signal with a logical value 0 and is sampled at the latest for a fourth bit of an expected bit sequence 11101, as the fourth bit of the expected bit sequence 11101.

9. The subscriber station as recited in claim 8, wherein:

in a frame which the communication control device has sampled from the sampled signal, the communication control device is configured to ignore a sampled value of the first bit of the predetermined field and to evaluate a random value for a third bit of the predetermined field as not faulty, and the communication control device is configured to evaluate a frame which the communication control device has sampled from the sampled signal as faulty when the second bit of the predetermined field was sampled as logic 0.

10. The subscriber station as recited in claim 8, wherein the communication control device is configured to activate a hard synchronization when the second bit of the predetermined field is sampled as logic 1.

11. The subscriber station as recited in claim 1, further comprising:

a transceiver configured to transmit a transmit signal onto the bus of the bus system, and/or to receive the sampled signal from the bus of the bus system.

12. The subscriber station as recited in claim 11, wherein:

the communication control device is configured to generate the transmit signal, and the communication control device is configured to signal to the transceiver using a pulse-width modulation in the transmit signal that the transceiver has to switch its operating mode to an operating mode for transmitting in the first communication phase or to an operating mode for transmitting in a second communication phase.

13. The subscriber station as recited in claim 11, further comprising:

a signal-improvement module configured to accelerate a transition on the bus in the first communication phase from a dominant bus level to a recessive bus level, which is able to be overwritten by the dominant bus level;

wherein the transceiver is configured to additionally activate the signal-improvement module for an acceleration of the transition from one of the bus levels of the second communication phase to the recessive level of the first communication phase when the subscriber station is a transmitter of the transmit signal onto the bus and the transceiver switches from an operating mode in which the communication control device transmits the transmit signal onto the bus of the bus system in the second communication phase, to an operating mode in which the communication control device transmits the transmit signal onto the bus of the bus system in the first communication phase.

14. The subscriber station as recited in claim 1, wherein:

the predetermined frame format is compatible with CAN FD, and negotiations take place in the first communication phase as to which one of the subscriber stations of the bus system is given an at least intermittent exclusive, collision-free access to the bus in a following second communication phase.

15. A bus system, comprising:

a bus; and at least two subscriber stations which are connected to one another via the bus in such a way that they are capable of serially communicating with one another and of which at least one subscriber station includes a communication control device configured to control communication of the subscriber station with at least one other subscriber station of the bus system;

wherein:

a bit time in a first communication phase of the bus system can differ from a bit time in a second communication phase of the bus system;

the communication control device is configured to sample and evaluate, according to a predetermined frame format, a signal received from a bus of the bus system, the sampled signal being based on a transmit signal generated by another subscriber station;

the predetermined frame format includes a predetermined field that (a) indicates a transition from the second communication phase to the first communication phase and (b) includes two or three bits having a logical value of 1 between a beginning of the predetermined field and a following falling edge of the predetermined field;

during the evaluation, the communication control device is configured to determine that a sampled bit sequence of the sampled signal constitutes a valid instance of the predetermined frame format by recognizing the predetermined field as present and valid, independently of whether only one bit or two consecutive bits having the logical value 1 were sampled between the beginning of the predetermined field and the following falling edge of the predetermined field in the sampled signal; and the communication control device is configured to perform synchronization at the falling edge of the predetermined field of the valid instance of the predetermined frame format in the sampled signal.

16. A method for communication in a serial bus system, wherein a bit time in a first communication phase of the bus system can differ from a bit time in a second communication phase of the bus system, the method being executed using a subscriber station of the bus system which has a communication control device, the method comprising the following steps:

controlling, using the communication control device, a communication of the subscriber station with at least one other subscriber station of the bus system;

sampling, by the communication control device, a signal received from a bus of the bus system, the sampled signal being based on a transmit signal generated by another subscriber station;

evaluating, by the communication control device, the sampled signal according to a predetermined frame format, wherein the predetermined frame format includes a predetermined field that (a) indicates a transition from the second communication phase to the first communication phase and (b) includes two or three bits having a logical value of 1 between a beginning of the predetermined field and a following falling edge of the predetermined field, wherein, during the evaluation, the communication control device determines that a sampled bit sequence of the sampled signal constitutes a valid instance of the predetermined frame format by recognizing the predetermined field as present and valid, independently of whether only one bit or two consecutive bits having the logical value 1 were sampled between the beginning of the predetermined field and the following falling edge of the predetermined field in the sampled signal; and performing, by the communication control device, synchronization at the falling edge of the predetermined field of the valid instance of the predetermined frame format in the sampled signal.

* * * * *